United States Patent [19]
Smith, II

[11] Patent Number: 5,568,905
[45] Date of Patent: Oct. 29, 1996

[54] BICYCLE CABLE KEEPER

[76] Inventor: Clayton E. Smith, II, 30 Don Galla Ct., Jacksonville, Fla. 32211

[21] Appl. No.: 206,327

[22] Filed: Mar. 7, 1994

[51] Int. Cl.⁶ ..................................................... F16L 3/08
[52] U.S. Cl. .......................... 248/65; 248/74.2; 248/74.3; 248/230.8
[58] Field of Search ........................ 248/65, 68.1, 74.1, 248/74.2, 74.3, 73, 230.8

[56] References Cited

U.S. PATENT DOCUMENTS

| | | | |
|---|---|---|---|
| 2,489,119 | 11/1949 | Burns, Jr. et al. | 248/68.1 |
| 2,515,603 | 7/1950 | Kaplan . | |
| 3,458,163 | 7/1969 | Egerton-Smith | 248/67.5 |
| 3,893,647 | 7/1975 | Kennedy | 248/74.3 |
| 4,369,944 | 1/1983 | Hobart, Jr. | 248/56 |

FOREIGN PATENT DOCUMENTS

| | | | |
|---|---|---|---|
| 2280013 | 2/1976 | France | 248/74.1 |
| 3312865 | 10/1984 | Germany | 248/74.1 |

*Primary Examiner*—Ramon O. Ramirez
*Assistant Examiner*—Derek J. Berger
*Attorney, Agent, or Firm*—Arthur G. Yeager

[57] ABSTRACT

A bicycle cable keeper for attaching bicycle cables to the bicycle frame, the keeper being a small saddle with a groove along its outside arcuate surface and its inside arcuate surface to be clamped to frame tubing by an encircling strap within that outside surface. The inside surface has at least one concave recess to clamp around a cable when the encircling strap is tightened. The keeper may include two such saddles on opposite sides of a tubing and fastened thereto with a single strap encircling both saddles, one of the saddles usually including an enlarged recess on the outside surface to nestingly receive the strap buckle.

18 Claims, 2 Drawing Sheets

BICYCLE CABLE KEEPER

BACKGROUND OF THE INVENTION

This invention relates to a keeper for use in fastening brake cables or electric cables to the frame of a bicycle to eliminate sagging loose cables that might become entangled with the rider's feet, legs or hands.

Generally, a modern bicycle has hand-operated brakes on both wheels, and, at least for adult bicycles, includes a chain drive with the capability of being shifted from one set of gears and sprockets to another for purposes of changing the gear ratio, and thereby, the speed of the bicycle. These features require use of wires and cables that must extend from one part of the bicycle frame to another to provide electrical conduits and conduits for plunger shift cables and brake cables. Without some type of keepers these wires and cables may become entangled in the drive chain or hamper the steering or the rotation of the wheels. In the past the wires and cables have been taped or tied to the frame by any means available, e.g., tire tape, twine, wire, a plastic tie, or the like. None of the prior art keepers has been entirely satisfactory and there has been a need for improved means to clamp cables and wires to a bicycle frame.

It is an object of this invention to provide a novel cable keeper for use on bicycles. It is another object of this invention to provide a novel molded plastic saddle for clamping one or two cables or wires to a tubular frame member by means of an encircling strap. An additional object is to provide a pair of keepers capable of holding two or three cables closely against the tubular frame member and to do so with an enhanced visual appearance.

BRIEF SUMMARY OF THE INVENTION

This invention relates to a cable keeper adapted to be clamped by means of a girth-like strap to a cylindrical support member. The keeper includes a crescent-shaped saddle with an outside convex surface, an inside concave surface, and a central axis parallel to the longitudinal axis of the cylindrical support member. A groove extends along at least a portion of the outside surface substantially perpendicular to the central axis to receive and contain the strap. A concave or cylindrical recess is positioned on the inside surface parallel to the central axis and adapted to nest the cable running longitudinally of the support member.

In preferred and specific embodiments of the invention the cable keeper is joined to one or two cables and the entire combination is clamped to a cross bar or other frame member of a bicycle. Preferably the cable keepers of this invention are used in pairs with one of the pair having two spaced cylindrical recesses on the inside surface to seat and clamp two parallel cables or wires, while the other of the pair includes one cylindrical recess and an enlarged socket to receive a buckle of the strap.

BRIEF DESCRIPTION OF THE DRAWINGS

The novel features believed to be characteristic of this invention are set forth With particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The invention is best understood by reference to the attached drawings and the reference numbers identifying specific portions of the invention.

Figure 1:
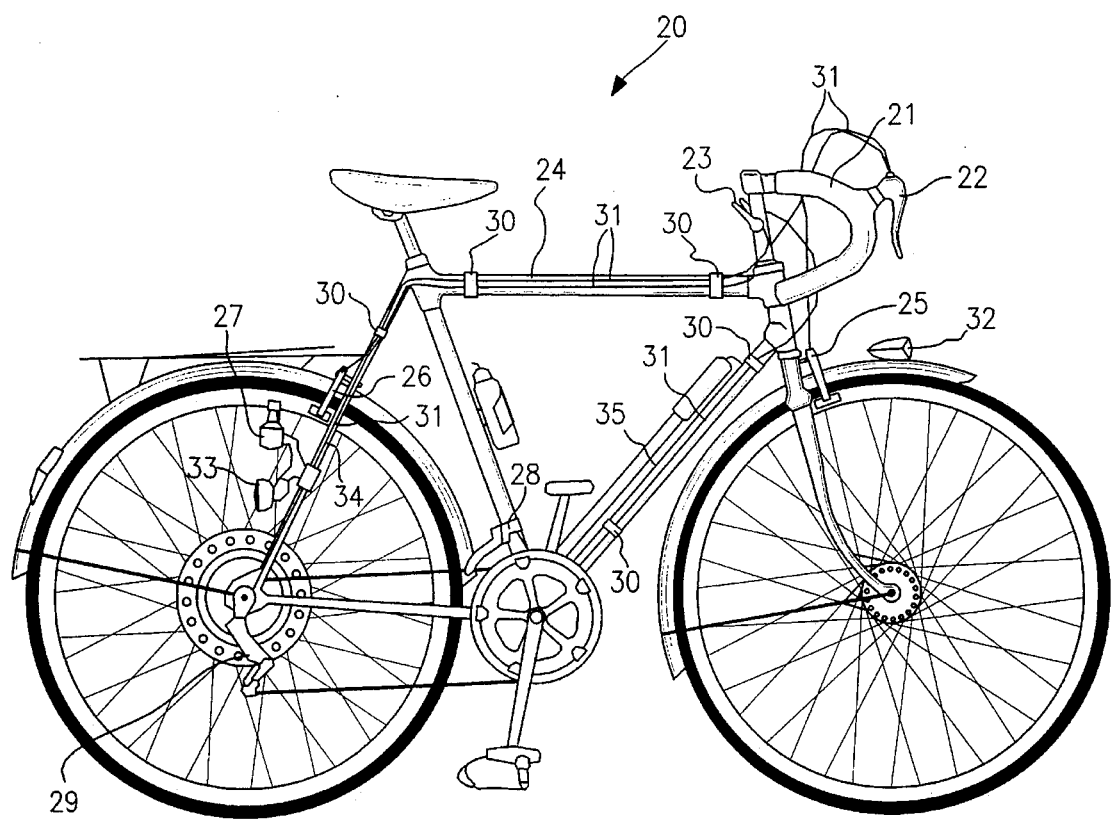
FIG. 1 is a side-elevational view of a racing bicycle with brake cables and electric wires.

The invention is most specifically employed with respect to a bicycle having electric wires and/or control cables. FIG. 1 illustrates a racing bicycle 20 which has lights, brakes operated by hand levers, and a system for shifting gears to change speed and power. Bicycle 20 has handlebars 21, brake levers 22, a gear shift lever 23, a front brake 25, a rear brake 26, a generator 27, a front derailleur 28, a rear derailleur 29, and a tubular frame including a crossbar 24, a down tube 35 and a seat stay 34. In order to control front brake 25, there must be a cable to connect a brake lever 22 to front brake 25. Similarly, there must be a cable to connect a brake lever 22 to rear brake 26. Generator 27 develops electricity to operate front light 32 and rear light 33, and electric wires must connect generator 27 to lights 33 and 32 in order to operate the lights. Furthermore, the shifting of gears through front derailleur 28 and/or rear derailleur 29 requires cable controls to be operated from shift lever 23. Thus there may be six wires or cables to operate lights, brakes, and the shifting of gears. It is obvious that such wires or cables are preferably supported along the frame members so as to keep from entangling the rider's feet and arms. Various procedures for doing this have been tried, including wrapping tire tape, wire, or plastic ties around a wire or cable and the nearest tubing member of the frame. This procedure is not aesthetically acceptable. In some instances the wires and cables have been strung inside a frame member with holes drilled in each end of the tubing to permit the wire or cable to emerge from the tubing to be connected to an operational lever or terminal. This procedure weakens the frame and may also cause abrasion of the wire or cable. Twine or wire has been used to tie the wire or cable to the frame, but this has a sloppy appearance and also permits the wire or cable to slide and cause sagging between tied locations. Specialty straps have been developed for tying one wire to a frame member. These are neat in appearance, but do not handle a plurality of wires or cables.

Figure 5:
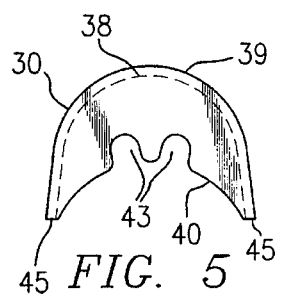
FIG. 5 is an end elevational view of a double cable keeper of this invention.
Figure 7:
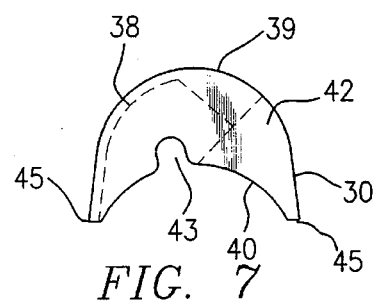
FIG. 7 is an end elevational view of a single cable keeper having a buckle recess of this invention.
Figure 6:
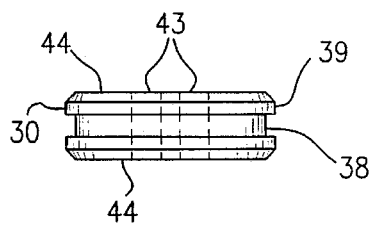
FIG. 6 is a top plan view of the cable keeper of FIG. 5.
Figure 8:
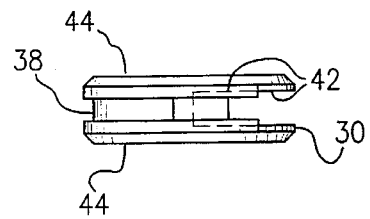
FIG. 8 is a top plan view of the cable keeper of FIG. 7.

The present invention is a keeper 30 in the shape of a crescent shaped saddle member, as seen in FIGS. 5–8. FIGS. 5 and 6 illustrate a keeper to handle two parallel wires or cables in spaced concave recesses 43, which are smaller in diameter than the casing of the cables to be received therein. The keeper 30 has an arcuate convex outer surface 39 and an arcuate concave inner surface 40, and two parallel side walls 44. The outside surface 39 and the inside surface 40 intersect at corners 45. Inner surface 40 is adapted to fit nestingly around a portion of the outside surface of a frame tube. Around the outside arcuate convex surface 39 is a groove 38 to receive and contain a strap fastener that will extend around keeper 30 and also around the frame member to which keeper 30 is attached. Groove 38 may extend completely around outer surface 39 or a lesser amount at least about one-half of surface 39 in its central portion between corners 45. FIGS. 7–8 show a keeper 30 with only one concave recess 43 for a wire or cable, but which also has an enlarged recess 42 to seat the buckle of the strap fastener (not shown here, but seen in FIGS. 2–4 as 41 on strap 37). The purpose in providing the recess is, firstly, to assist in holding the buckle while the strap is tightened, and secondly, to reduce the protrusion of the buckle so as to prevent catching on clothing, or the like. The keepers 30 of this invention are preferably made of a molded plastic material which is substantially rigid, i.e., reasonably stiff, and yet slightly flexible, e.g., high density polyethylene, polyacetal, polycarbonate, other polyolefinic material, hard rubber, etc. Inside surface 40 of keeper 30 generally has a somewhat smaller diameter than the frame tubing to which it is to be strapped, so that upon tightening the strap inside surface 40 may distort slightly to match the outside diameter of the frame tubing. The outer casing of the cable or cables 31 extend beyond the major concave inner surface 40 so that they are frictionally squeezed radially between the keeper 30 and tubing.

Figure 2:
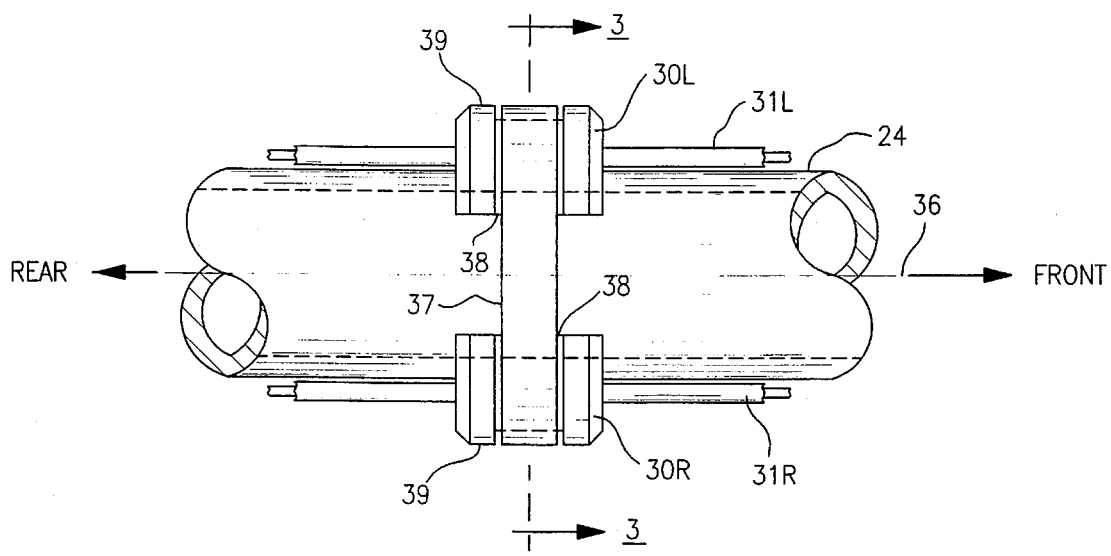
FIG. 2 is a partial top plan view of the crossbar of a bicycle, such as that of FIG. 1, to which cable keepers of this invention have been clamped.
Figure 4:
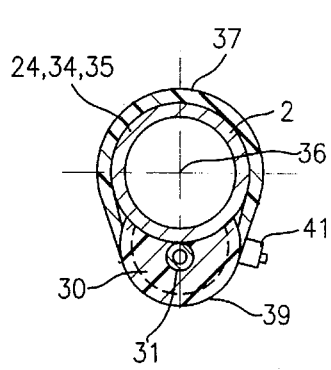
FIG. 4 is a cross-sectional view similar to that of FIG. 3 and showing the use of a single cable keeper on a smaller tubing.
Figure 3:
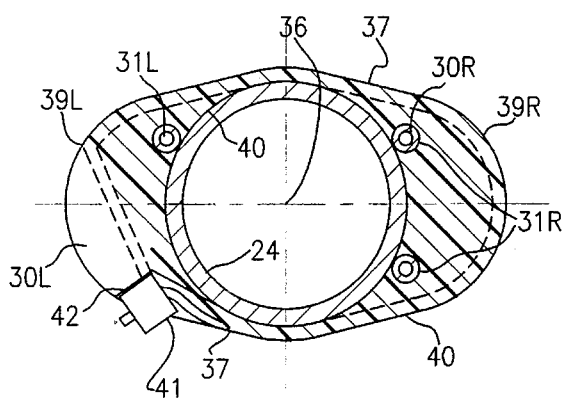
FIG. 3 is a cross-sectional view taken at 3—3 of FIG. 2.

In FIGS. 2–4 there are shown examples of how the keeper of this invention is used. FIG. 2 shows a piece of crossbar 24 looking down from the rider's position with the front end of the bicycle to the right and the rear to the left and a central axis 36 of crossbar 24 as seen in FIG. 2. The section of crossbar 24 is fitted with two keepers 30R and 30L of this invention, wherein R and L designate right and left as viewed by the rider. Keeper 30R is the same as the keeper of FIGS. 5 and 6; and keeper 30L is the same as the keeper of FIGS. 7 and 8. Wire 31L is an electric wire and cables 31R are control cables; e.g., one to rear brake 26 and the other to rear derailleur 29. A single strap fastener 37 is wrapped around both of keepers 30L and 30R as well as around the outside of crossbar 24. Buckle 41 of strap 37 is held in the recess 42 (see FIGS. 7–8) of keeper 31L, and is directed downwardly so as not to catch on the rider's clothing.

FIG. 4 shows an alternative embodiment which is the same as keeper 31L of FIG. 3 except that a buckle recess 42 is omitted, leaving the buckle 41 to rest on the outside surface 39 of keeper 30 somewhere along its convex outside surface. Where there is little chance of buckle 41 being caught by clothing or machinery, it is acceptable to use a keeper 30 without a buckle recess 42.

Generally strap 37 is flat, thin and rectangular in cross-section, and therefore, groove 38 is rectangular in cross-section. This is not critical; it is only important for groove 38 to match strap 37; and, preferably, for keeper 30 to include a buckle recess.

The above description refers to the keepers of this invention being used to attach wires and control cables to a bicycle frame. This invention is useful in other places. There are frequent instances where wires or cables must extend from one location to another, therein conduits are included to contain the wires or cables. The keepers of this invention provide an alternative to the expense of a conduit. If there is a water pipe or an electric cable, or other tubular member available, the keepers of this invention may be used to fasten wires or cables to that pipe, cable, or tubular member. Thus, this invention provides a generalized means to string wire or cable by attaching the keepers to any available tubular support.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A cable keeper comprising a substantially rigid crescent-shaped saddle in both an installed and uninstalled condition having an arcuate outside surface and an arcuate inside surface, which intersect at a pair of spaced corners, said saddle including a pair of closely spaced outer side walls connected to each of said arcuate surfaces, said outside surface having a groove extending generally at least half of said outside surface, said inside surface having a concave recess therein slightly smaller than a cable adapted to be disposable only partly therein to expose part of a cable beyond said arcuate surface and extending between said outer side walls and adapted to receive a cable nestingly therein when said arcuate inside surface is adapted to be disposed with part of a cable in juxtaposition to a tubing, and strap means disposed in said groove and tightly encircling said keeper and adapted to encircle a tubing whereby part of a cable is retained engaged with and juxtaposed to a tubing.

2. The cable keeper of claim 1 further comprising another crescent-shaped saddle identical to said crescent-shaped saddle and adapted to retain another cable engaged with and juxtaposed to a tubing, said strap means encircling both of said saddles which are adapted to be positioned on opposed surface portions of a tubing, said saddles being spaced apart from each other and out of any contact therebetween.

3. The cable keeper of claim 1 wherein said inside surface includes another concave recess spaced from said concave recess and adapted to receive another cable nestingly therein.

4. The cable keeper of claim 1 wherein said groove extends along the entire said outside surface thereof.

5. The cable keeper of claim 1 wherein said saddle includes an enlarged recess between said outer side walls communicating with said groove, said strap means including an elongated strap and a buckle member for tightening and retaining said strap about said keeper, said buckle member being seated in said enlarged recess.

6. The cable keeper of claim 5 further comprising another crescent-shaped saddle identical with said crescent-shaped saddle without said enlarged recess, said strap encircling both of said saddles which are adapted to be positioned on opposed surface portions of a tubing.

7. The cable keeper of claim 6 wherein said inside surface of said another saddle includes another concave recess spaced from said concave recess and adapted to receive another cable nestingly therein.

8. The cable keeper of claim 7 wherein said groove of said another saddle extends along the entire said outside surface thereof.

9. The cable keeper of claim 1 wherein said strap means includes an elongated strap and a buckle member with said strap being tightly disposed in and along said groove.

10. The cable keeper of claim 9 wherein said saddle includes an enlarged recess in alignment with said groove between said outer side walls for receiving said buckle member therebetween.

11. A cable keeper comprising a substantially rigid crescent-shaped saddle in both an installed and uninstalled condition having an arcuate outside surface and an arcuate inside surface and having an axis parallel to a longitudinal axis of cylindrical tubing of a bicycle frame, said inside surface adapted to nestingly receive a portion of a cylindrical tubing of a bicycle frame, strap means encircling said outside surface and adapted to encircle a tubing of a bicycle frame, said outside surface having a groove along its outside surface extending about said saddle to receive and contain said strap means, and said inside surface having a concave recess smaller than a cable partly disposable therein and extending beyond said arcuate inside surface when said keeper is fully installed on a tubing of a bicycle frame and with an axis substantially parallel to a longitudinal axis of a tubing of a bicycle frame, said concave recess being adapted to only partly seat a cable extending parallel to a longitudinal axis of a tubing of a bicycle frame and to radially dispose a cable to be radially squeezed between said keeper and engaged directly with a tubing of a bicycle frame.

12. The cable keeper of claim 11 wherein said strap means includes an elongated strap and a buckle member with said strap being tightly disposed in and along said groove.

13. The cable keeper of claim 12 wherein said saddle includes an enlarged recess communicating with said groove to receive said buckle..member.

14. The cable keeper of claim 14, which includes another spaced concave recess extending parallel to said concave recess adapted to seat another cable running longitudinally of said tubing.

15. The cable keeper of claim 11 further comprising another crescent-shaped saddle identical to said crescent-shaped saddle and having its corners spaced from said spaced corners of said saddle, said strap means encircling both of said saddles which are adapted to be positioned on opposed surface portions of a tubing.

16. A cable keeper system for use in securing a bicycle control cable to a tubing member of a bicycle frame, said system comprising a frame of a bicycle having a tubing member, a control cable and a keeper having a substantially rigid crescent-shaped saddle in both an installed and uninstalled condition having a concave inside surface and a convex outside surface adapted in size and shape to be clamped against a portion of an outside surface of said tubing member, said keeper including a groove about said convex outside surface positioned perpendicular to said tubing member and adapted to receive a fastening girth strap disposed along said groove to clamp said saddle to said tubing member, said concave surface including a semi-circular recess parallel to said tubing member and adapted size and shape to provide only a partial seat for said control cable having an outer casing and running longitudinally of said tubing member whereby said casing of said cable is frictionally gripped radially between said keeper and engaged directly in contact with said tubing member.

17. The cable keeper of claim 16 including another parallel semicircular recess spaced apart from said recess.

18. The cable keeper of claim 16 further comprising a fastening girth strap, said girth strap and said groove being both rectangular in lateral cross-section with said strap substantially filling said groove.

* * * * *